United States Patent
Doshi et al.

(10) Patent No.: US 10,771,520 B2
(45) Date of Patent: Sep. 8, 2020

(54) METHODS AND SYSTEMS FOR INTELLIGENT UTILIZATION OF OFF-PEAK NETWORK BANDWIDTH

(71) Applicant: Comcast Cable Communications, LLC, Philadelphia, PA (US)

(72) Inventors: Nishant Doshi, Norristown, PA (US); Scott Auger, East Norriton, PA (US); Ambud Sharma, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 221 days.

(21) Appl. No.: 14/950,962

(22) Filed: Nov. 24, 2015

(65) Prior Publication Data
US 2017/0149855 A1    May 25, 2017

(51) Int. Cl.
| | |
|---|---|
| H04L 29/06 | (2006.01) |
| H04N 21/433 | (2011.01) |
| H04N 21/262 | (2011.01) |
| H04N 21/222 | (2011.01) |
| H04N 21/472 | (2011.01) |
| H04N 21/2225 | (2011.01) |
| H04N 21/4335 | (2011.01) |

(52) U.S. Cl.
CPC ....... *H04L 65/4084* (2013.01); *H04N 21/222* (2013.01); *H04N 21/2225* (2013.01); *H04N 21/26216* (2013.01); *H04N 21/26241* (2013.01); *H04N 21/4331* (2013.01); *H04N 21/4333* (2013.01); *H04N 21/4335* (2013.01); *H04N 21/47202* (2013.01)

(58) Field of Classification Search
USPC ......................................... 709/219
See application file for complete search history.

(56) References Cited

U.S. PATENT DOCUMENTS

| | | | |
|---|---|---|---|
| 7,917,612 B2* | 3/2011 | Maes ................. | G06Q 30/00 709/217 |
| 2009/0087167 A1* | 4/2009 | Seisun .............. | H04N 21/4147 386/296 |
| 2009/0292819 A1 | 11/2009 | Kandekar et al. | |

(Continued)

FOREIGN PATENT DOCUMENTS

EP    2779666    9/2014

OTHER PUBLICATIONS

Extended European Search Report and Written Opinion dated Feb. 28, 2017 by the European Patent Office for EP Application No. 16200461, which was filed on Nov. 24, 2016 and published as 3174305 on May 31, 2017 (Applicant—Comcast Cable Communications, LLC) (9 pages).

*Primary Examiner* — Hermon Asres
(74) *Attorney, Agent, or Firm* — Ballard Spahr LLP

(57) ABSTRACT

Methods and systems for intelligent use of off-peak bandwidth are disclosed. An example method can comprise receiving a request for content from a user device. The content server can transmit the content to the user device. Upon receiving a teardown command to suspend transmission of the content, after transmitting a first portion of the content to the user device, the content server can determine that playback of the content is likely to be resumed at a peak time. The content server can then pre-position a second portion of the content proximate to the user device prior to the peak time.

20 Claims, 6 Drawing Sheets

(56) References Cited

U.S. PATENT DOCUMENTS

| | | | | |
|---|---|---|---|---|
| 2010/0064314 A1* | 3/2010 | Li | ................. | H04N 21/4335 |
| | | | | 725/38 |
| 2010/0154011 A1* | 6/2010 | Soo | ............. | H04N 21/25816 |
| | | | | 725/101 |
| 2013/0031279 A1* | 1/2013 | Venugopal | ......... | H04L 12/1435 |
| | | | | 710/18 |
| 2013/0254815 A1* | 9/2013 | Pfeffer | ............ | H04N 21/47202 |
| | | | | 725/96 |
| 2014/0280702 A1* | 9/2014 | Barker | .............. | H04N 21/6582 |
| | | | | 709/217 |
| 2015/0326901 A1* | 11/2015 | Tiraspolsky | ........... | H04N 21/24 |
| | | | | 725/31 |

* cited by examiner

METHODS AND SYSTEMS FOR INTELLIGENT UTILIZATION OF OFF-PEAK NETWORK BANDWIDTH

BACKGROUND

Video on demand content has grown increasingly popular with users who wish to have more control over how content is viewed and interacted with. Presently, video on demand content can be viewed at any time convenient to a user. In practice, there are times of day when many users wish to access video on demand content and other content concurrently ("peak times"). Accessing video on demand services during peak times can frustrate users because at peak times (e.g., times when the most users view the content), there can be delays/lag in streaming content presented to the user and/or the content can be displayed at a lower quality than the user deems acceptable. These delays and/or reductions in quality can be related to, for example, high server utilization during peak times. However, because the demand for content is not steady, content providers typically must provide a quantity of servers that is sufficient to meet demand at peak times, resulting in increased cost to the provider and underutilized servers at off-peak times. Accordingly, it can be difficult for video on demand and/or instant access video service providers to provide video on demand servers to users that meet user needs at the peak times and remain economical during off-peak times. These and other shortcomings are addressed in the present disclosure.

SUMMARY

It is to be understood that both the following general description and the following detailed description are exemplary and explanatory only and are not restrictive. Provided, in one aspect, are methods and systems for intelligent utilization of off-peak network bandwidth. In particular, while video on demand or other types of instant access video networks are taxed at peak times, they often have excess capacity in non-peak times, such as overnight. The provided systems and methods allow for utilizing the excess capacity of network resources, such as servers, during off-peak times. For example, a user may begin watching a video on demand content item on a user device during a peak time, only to realize that he or she has other commitments. The content is then paused by the user, and the user oftentimes does not resume watching the content until the next peak time (e.g., the next day after work). In an aspect, rather than taxing the video on demand network servers during the next peak time, the methods and systems disclosed can pre-position the paused content, during an off-peak time, for consumption on the user device by transmitting the content during non-peak hours. The pre-positioned content can be accessed from the pre-positioned location, during the peak time, without adding any workload to the video on demand network (e.g., servers and other components).

In an aspect, a content server can receive a request for content from a user device and the content server can transmit (e.g., stream, download, etc.) the content to the user device. Upon receiving a teardown command (e.g., pause, stop, exit, etc.) affecting transmission of the content after transmitting a first portion of the content to the user device, the content server can determine that playback of the content is likely to be resumed at a peak time. The content server can then pre-position a second portion of the content for consumption by the user device prior to the peak time. For example, the second portion of the content can be stored on the user device, a local digital video recorder (DVR), a cloud-based DVR, an edge storage device, a neighborhood node, or the like.

In another aspect, a user device can transmit a request for content to a content server, and can receive a first portion of the content through a streaming connection to the content server. The user device can transmit a teardown command to pause or suspend display of the content to the content server. The user device can receive a second portion of the content as a download in response to a determination that playback of the content is likely to be resumed at a peak time. The second portion of the content may not include the first portion of the content. The user device can then store the download on a local storage device associated with the user device.

In another aspect, a content server can receive a request for content from a user device. The content server can transmit (e.g., stream, download, etc.) the content to the user device until receiving a teardown command to pause or suspend transmission of the content after transmitting a first portion of the content to the user device. The content server can determine a time at which playback of the content is likely to be resumed, and can further determine whether the determined time at which playback is likely to be resumed corresponds to a peak time period. The content server then can pre-position a second portion of the content closer to (proximate to) the user device or on the user device prior to the peak time when it is determined that playback of the content is likely to be resumed during the peak time period. The second portion of the content does not include the first portion of the content.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
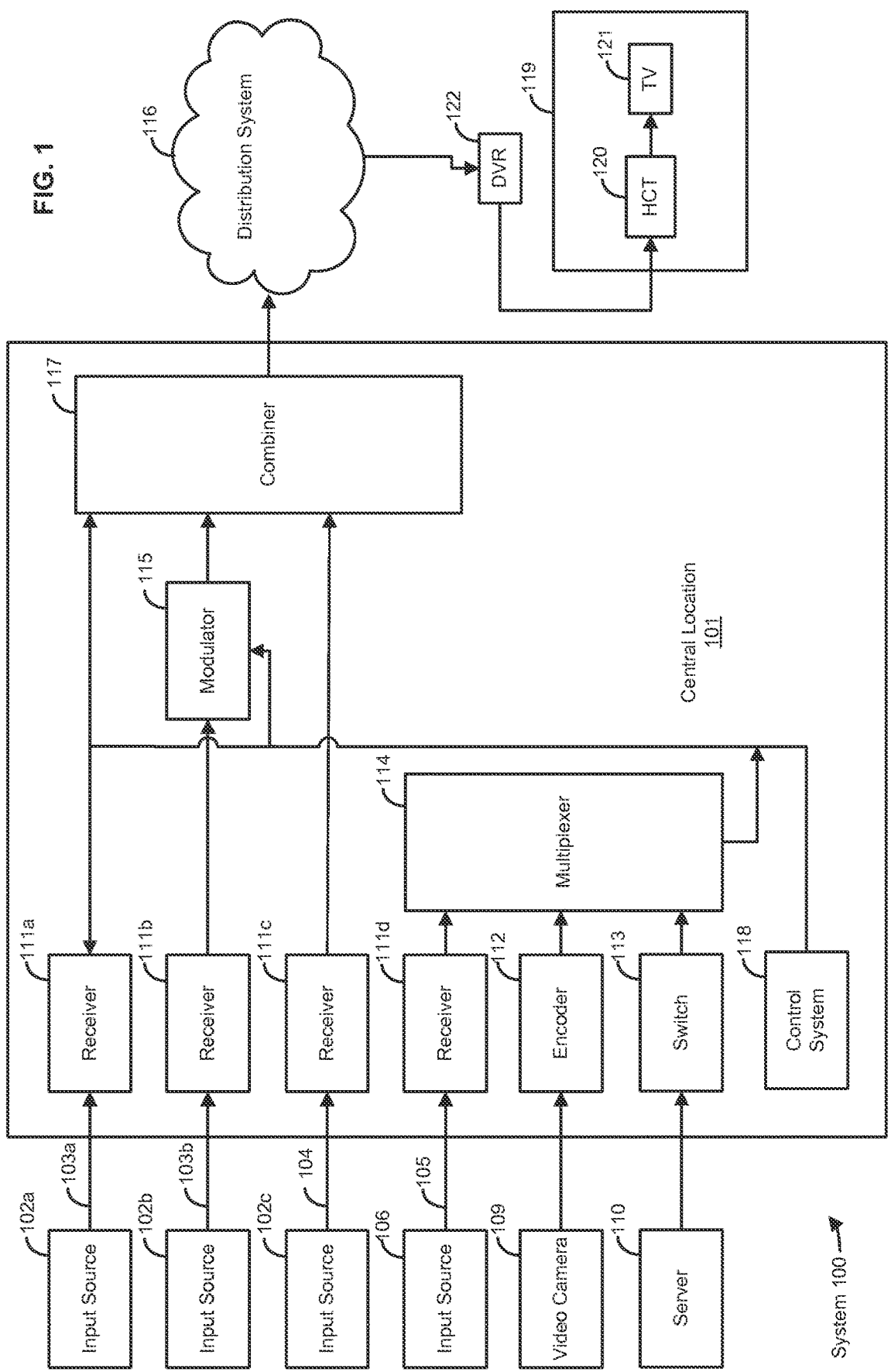
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for intelligent use of off-peak network bandwidth. In an aspect, the disclosure relates to methods and systems for pre-positioning content on a user device. For example, if a user pauses content while the content is being viewed by the user on a user device, a computing device (e.g., a video on demand (VOD) server) presenting the content can make a determination as to whether or not the user is likely to resume viewing the content during a peak time or an off-peak time. A peak time can comprise a time when content server utilization exceeds a predetermined threshold. In an aspect, peak times and off-peak times can be chosen based on historical averages of content server utilization. For example, if content servers typically exceed a threshold utilization from 8:00 pm until 11:00 pm, then the peak time can be designated as 8:00 pm until 11:00 pm. In an aspect, an off-peak time can comprise times when content server utilization is below the predetermined threshold. Accordingly, times that are not designated as "peak times" can be designated off-peak times. In another aspect, off-peak times can comprise times where the content server utilization is below a second threshold lower than the predetermined threshold. If the VOD server determines that the user is likely to resume viewing the content at a peak time, the VOD server can pre-position the content on the user device. Pre-positioning can comprise transmitting the content from the VOD server to the user device, as a download or a stream, during off-peak times when bandwidth utilization is relatively low. The content can then be stored locally on the user device, and can be played back locally wen the user wishes to resume viewing the content. In another aspect, the content from the VOD server can be pre-positioned on a network DVR associated with the user device.

In an aspect, a user can begin viewing content (e.g., VOD content) at a user device, and pause the content. The VOD server can determine that the user intends to resume viewing the content at a peak time (e.g., a time when bandwidth utilization at the VOD server is high). In response to that determination, the VOD server can pre-position at least a portion of the content on the user device or a network DVR at an off-peak time. That is, the VOD server can transmit at least a portion of the VOD content to the user device at a time when bandwidth utilization is relatively low. The content can be stored locally on network DVR or a storage device in the user device, in a separate partition. For example, the storage device can include a temporary encrypted partition. In an aspect, the temporary encrypted partition can be used to help control the user's ability to access the content and to ensure that operations performed on the content are authorized by a content provider. When the user wishes to resume playback of the content, the user device can view the content locally from the storage device, without using any bandwidth at the VOD server.

When the user device requires more storage for other purposes, the partition can be deleted or reduced in size. If unviewed content is removed in this way, the unviewed content can be viewed by streaming the content from the VOD server when the user resumes watching the content.

Further, user viewing patterns can be used to pre-position content before the VOD server receives a request for the content from the user. For example, if a user has watched a portion of a series of content items (e.g., two television episodes out of a series of five television episodes), one or more of the remaining content items in the series can be pre-positioned on the user device.

The present disclosure relates to methods and systems for intelligently using off-peak bandwidth. FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., video, audio, images, text, application files, data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, such as wireless paths (e.g. satellite paths 103a, 103b) and terrestrial path 104. The central location 101 can also receive content from an input source 106 via a direct line 105. Other input sources can comprise capture devices, such as a video camera 109, a server 110, and/or the like. The content provided by the content server can comprise a single content item, a portion of a content item (e.g., content fragment), a content stream, a multiplexed stream that includes several content items, and/or the like.

The central location 101 can comprise one or a plurality of receivers 111a, 111b, 111c, 111d that are associated with one or more corresponding input sources. The central location 101 can comprise one or more encoders 112, switches 113, multiplexers, and/or the like. For example, an encoder 112 can compress, encrypt, transform, and/or otherwise encode content. As a further example, the encoder 112 can encode content based on one or more compression standards, such as MPEG. As another example, the encoder can receive content from the video camera 109 and/or other source and apply one or more encoding algorithms to the received content. A switch 113 can provide access to server 110, which can be a Video On Demand (VOD) server, a Pay-Per-View server, a data server, an internet router, a network system, a phone system, and the like. Some signals may require additional processing, such as signal multiplexing, prior to being modulated. Such multiplexing can be performed by multiplexer 114.

The central location 101 can comprise one or more modulators 115 for interfacing with a distribution system 116. As an example, a modulator can receive content from a receiver 111, encoder 112, multiplexer 114, and/or the like. A modulator 115 can convert the received content into a modulated output signal suitable for transmission over the distribution system 116. For example, a modulator 115 can map portions of the content to data bits expressed as signals (e.g., sinusoidal signals) at corresponding subcarrier frequencies of a data symbol. The output signals from the modulators 115 can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for a television system, billing for each user, conditional access for content distributed to users, and the like. The control system 118 can provide input to the modulators for setting operating parameters, such as system specific MPEG table packet organization or conditional access information. The control system 118 can be located at central location 101 or at a remote location.

The distribution system 116 can distribute content from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not necessarily fixed. By way of example, a user can receive content from the distribution system 116 on a mobile device such as a laptop computer, PDA, smartphone. GPS, vehicle entertainment system, portable media player, and the like.

In an aspect, the methods and systems disclosed can be performed by a VOD server (e.g., the server 110) and/or one or more user devices, such as the HCT 120 and/or TV 121. Other user devices can include, but are not limited to a DVR or Network DVR, a desktop computer, a smart television, and the like. The VOD server can transmit VOD content to the user location. For example, the VOD server can transmit the content using a streaming transmission to be viewed at the user location 119 via the HCT 120 and/or the TV 121. When the VOD content is paused at the user location, the server 110 can make a determination as to when the VOD content is likely to be resumed. If the VOD content is likely to be resumed during a peak time (e.g., at a time when bandwidth utilization at the server 110 is high), the server can pre-position the content at the user location 119. For example, the VOD content can be pre-positioned at the HCT 120. In another aspect, the VOD content can be pre-positioned proximate to the user location (e.g., at a network DVR 122 for consumption on a user device (e.g., the HCT 120 and/or the TV 121) at the user location 119, at an edge node (e.g., a neighborhood node) associated with the user, and the like).

Alternatively, when it is determined that the VOD content is for consumption during off-peak times, the VOD content can remain paused, so that it can be resumed when the user is prepared to resume the transmission.

In an aspect, the VOD server (e.g., the server 110) can receive a request for content from a user device (e.g., the HCT 120 and/or the TV 121). In response to the request for content, the VOD server can provide the requested content in a content transmission to the user device. For example, the content can be provided through a streaming transmission method. In an aspect, the VOD server can transmit the requested content using User Datagram Protocol (UDP) on an Internet Protocol (IP) network (i.e., IP/UDP) or any other streaming transmission method. The user device can then receive a teardown command (e.g., pause, stop, exit, etc.) from a user after a first portion of the content has been transmitted. Once the teardown command is received at the user device, the user device can transmit the teardown command to the VOD server. The VOD server, in response to receiving the teardown command, can adjust the content stream based on the teardown command. For example, if the teardown command is a pause command, the VOD server can pause or otherwise suspend the content stream being transmitted to the user device.

The VOD server can determine if the user is likely to resume the content stream at a peak time. For example, the VOD server can determine a time (or time range) that the user is likely to resume playback of the content at the user device. For example, a time range can include a specific range of time (e.g., between 7:00 pm and 9:00 pm), or a coarse estimate (e.g., morning, afternoon, evening, late night, etc.). The VOD server can also determine a peak time period (e.g., a time period where bandwidth utilization at the VOD server is relatively high). The time (or time range) that the user is likely to resume playback of the content can then be compared to the determined peak time period. If the time (or time range) that the user is likely to resume playback of the content overlaps with the peak time period, it is determined that the user is likely to resume playback of the content at a peak time.

When it is determined that the user is likely to resume playback of the content at a peak time, the VOD server can pre-position at least a second portion of the content for consumption by the user device prior to the peak time period. In an aspect, the VOD server can transmit the at least the second portion of the content to the user device or a network DVR associated with the user device as a file download. The user device or the network DVR can store the file download on a local storage. When the user resumes playback of the content, the at least the second portion of the content can be provided from the local storage, without requiring any further data transmission from the VOD server.

Figure 2:
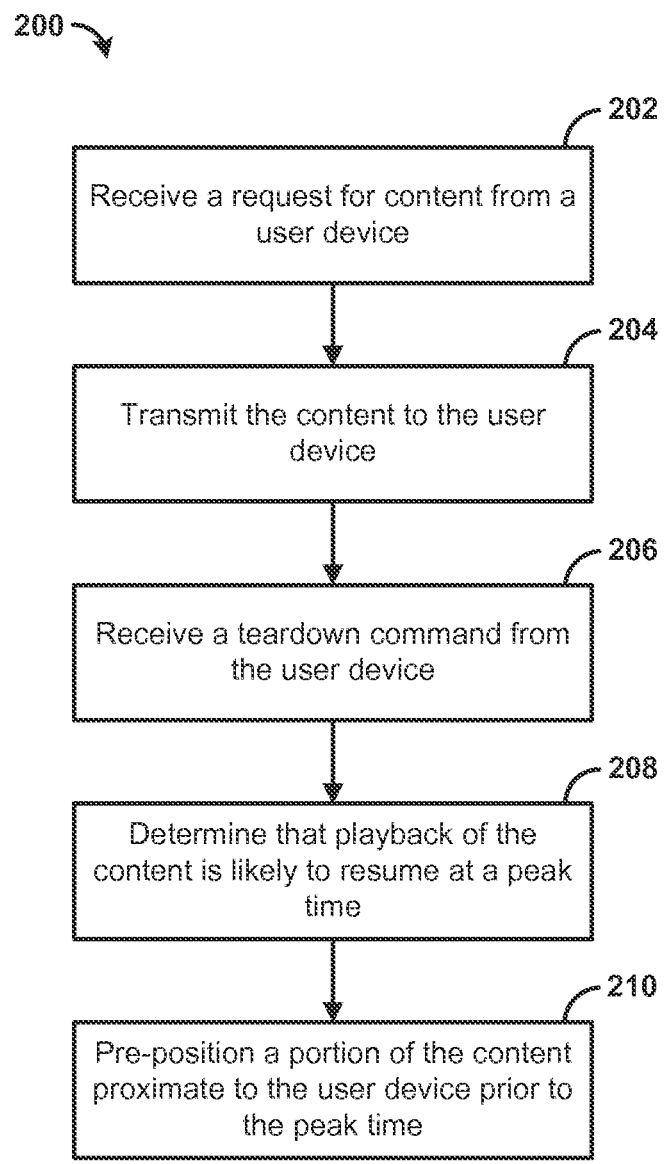
FIG. 2 is a flowchart illustrating an example method.

FIG. 2 is a flowchart illustrating an example method 200. At step 202, a content server (e.g., a VOD server, such as the server 110) can receive a request for content from a user device. The request can be received according to an Internet protocol. The request can comprise an identifier to be used by the VOD server for identifying what content is being requested (e.g., a title of a content item, an identification number associated with the content item, etc.). Content can be, for example VOD content. In an aspect, the user device can comprise a set top box, a digital video recorder (DVR), a smart TV, a smartphone, a tablet computer, a laptop computer, and the like. In an aspect, when the user device comprises a device other than a set top box, content can be cached on a user set top box and retrieved by the user device leveraging existing technology. In an aspect, the content provider leases the set top box to the user. Accordingly, when content is stored on the set top box, the content remains on hardware owned by the content provider. In another aspect, the content can be cached on the device that requested the content. This can allow for consumption of the content even when the user device is not in communication with the set top box.

In step 204, the content server can transmit the requested content to the user device. In an aspect, transmitting the content to the user device can comprise streaming the content to the user device. In an aspect, streaming can comprise transmitting the content from the content server to the user device such that the user device can begin presenting the content prior to receiving the entire content file. For example, encoded audio and video streams can be assembled in a container bitstream such as MP4, FLV, WebM, ASF or ISMA. Streaming audio and video can be transmitted using protocols such as the Internet protocol suite, including transmission control protocol (TCP/IP), hypertext transfer protocol (HTTP), and the like. In an aspect, one or more portions of the content can be stored in a cache as it is received. In an aspect, the content can be compressed using a compression algorithm selected based on the capabilities of the user device and/or the content server, and the content being compressed. For example, audio content can be compressed using a codec such as MP3, Vorbis, AAC, or the like, and video content can be compressed using a codec such as H.264 or VP8, or the like.

The user device can receive the content stream and provide the streamed content to a user. In an aspect, providing the content to the user can comprise receiving the container bitstream, and separating the bitstream into component streams, such as a video stream and an audio stream. The video and audio streams contained in the bitstream can be separately decompressed using the same codecs used to compress the audio and video. The decompressed streams can then be presented to the user through the user device. During presentation, the user can provide a teardown command (e.g., pause, stop, exit, etc.) by interacting with the user device. For example, the user can interact using a remote control associated with the user device, an on-screen control associated with the user device, etc.

In step 206, the content server can receive a teardown command (e.g., pause, stop, exit, etc.) that affects streaming of the content. In an aspect, the teardown command can comprise a timestamp. As examples, the timestamp can indicate a time relative to the beginning of the content that the teardown command was issued, an absolute time that can be used to calculate the time relative to the beginning of the content that the teardown command was issued, and the like. In an aspect, the teardown command can be received after streaming a first portion of the content to the user device. The first portion of the content can comprise the portion of the content presented to the user before receiving the teardown command. In an aspect, the teardown command can be received from the user at the user device. For example, the user can issue a teardown command using a remote control associated with the user device, by interacting with controls displayed on a display associated with the user device, or the like. In an aspect, the teardown command issued by the user can cause the user device to suspend playback of the content. In an aspect, the user device can transmit the teardown command to the content server. In response to receipt of the teardown command, the content server can temporarily cease streaming the content to the user device. Further, the content server can store the timestamp received as part of the teardown command In step 208, the content server can determine that playback of the content is likely to be resumed at a peak time. In an aspect, the determination can be made immediately following receipt of a teardown command. In another aspect, the determination can be made in response one or more events. The one or more events can comprise one or more of a predefined time period (e.g., five minutes) elapsing following receipt of the teardown command, user navigation away from the paused content, receiving a command to turn off the user device, and the like.

In an aspect, the content server can determine that playback of the content is likely to be resumed at a peak time based on one or more of a user viewing history, user viewing patterns, a length of the content, a percentage of the content that has already been played, a cost of purchase of the content, a length of content rental, etc. For example, a particular viewer may have a history that indicates the user does not begin watching content later than 10:00 pm. Moreover, it can be observed than particularly long pieces of content are unlikely to be resumed later than a particular time (e.g. content that exceeds 90 minutes is unlikely to be resumed after 10:00 pm). In another aspect, it can be observed that when a user has viewed more than 95% of a content item (e.g., the user has watched an entire movie, but issued a teardown command before finishing the closing credits), the user is unlikely to resume the content. Similarly, if a user watches only a very short portion of a content item (e.g., less than 5%), it can be determined that the content item was not to the user's liking, or was selected in error. In another aspect, when the content rental window ends prior to the next peak time, it can be determined that the user is likely to resume the content before the next peak time.

In an aspect, the content server can determine that content is to be resumed at a peak time if the content remains paused for a predefined time period. For example, if the content stream is paused for more than five minutes, the content server can determine that the content stream will resume playback during a peak time. In an aspect, the content server can determine that if content is paused during a peak time period, it is likely to be resumed in peak time period as well.

In another aspect, the content server can first determine a time of day that the user is likely to resume playback of the content. In an aspect, historical data from one or more users can be used to determine when content is likely to be resumed. In an aspect, the historical data can be retrieved from the content server or another server controlled by the content provider. For example, the historical data can comprise at least a time at which one or more users requested a content item and a time at which the one or more users paused streaming of the content item can be correlated with a time that streaming of the content item is resumed. In an aspect the historical data can be based on the particular user that submitted the content request, users geographically close to the particular user, users who viewed the same content, a random sampling of users, or all users. In another aspect, the historical data can be associated with the content item itself, rather than being related to the user. For example, particular kinds of content can be determined to be more likely to be resumed during peak times, while other kinds of content (e.g. children's shows) can be determined to be less likely to be resumed during peak times).

In an aspect, the content server can determine a peak time. The peak time is a time when the content server is busy (e.g., its peak utilization). In an aspect, the peak time can be based on, for example, predefined times when the content server is typically busy. For example, if the content server typically experiences heavy traffic between the hours of 8:00 pm and 11:00 pm, then peak time can be identified as 8:00 pm until 11:00 pm. In another aspect, the peak time can be determined based on expected bandwidth utilization at the content server at the time the user is expected to resume playback. The expected bandwidth utilization can be determined based on, for example, one or more of bandwidth utilization 24 hours prior to the time the user is expected to resume playback, bandwidth utilization in one or more hours just prior to the time the user is expected to resume playback, and the like. As further examples, peak time can be determined based on time of day and/or day of week, or an overall bandwidth utilization at the content server. Factors that can affect peak time include, for example, location, user demographics, overall user density and the like. In an aspect, operators of the content server can determine peak times by other criteria. For example, peak times can include municipal holidays, public events (e.g., election days), natural events (e.g., "snow days" or other days that schools and/or offices are closed because of weather emergencies), and the like. The time the user is expected to resume playback can be compared to the determined peak time. For example, the time the user is expected to resume playback can be one or more of a particular time, a time range, or a coarse description of a time of day (e.g., morning, afternoon, evening, late night, etc.) based on the historical data. When the time the user is expected to resume playback is entirely contained within or at least overlaps the peak time, it can be determined that the user is expected to resume playback of the content during a peak time.

In step 210, the content server can pre-position at least a second portion of the content for consumption by the user device prior to the peak time. In an aspect, the entirety of the content (e.g., first portion and second portion) can be pre-positioned on the user device prior to peak time. In another aspect, at least the second portion of the content can be prepositioned proximate to the user device. For example, at least the second portion of the content can be pre-positioned at a local DVR, a cloud-based DVR, a storage device associated with the user device, an edge storage device or a neighborhood node associated with the user device, and/or the like. As a particular example, the at least the second portion of the content can be positioned such that the at least the second portion of the content is far enough from the source (e.g., the content server) so as to avoid wasting bandwidth. In some aspects, determining a position at which the at least the second portion of the content can be stored can comprise identifying one or more portions of a network that are likely to be heavily taxed, and prepositioning the at least the second portion of the content downstream of the one or more portions of the network that are likely to be heavily taxed (e.g., between the one or more portions of the network that are likely to be heavily taxed and the user device).

In an aspect, pre-positioning can comprise transmitting the at least a second portion of the content proximate to the user device as a download. For example, the content can be transmitted to the user device and stored locally on a storage device associated with the user device. Alternatively, the content can be transmitted to a network DVR associated with the user device or an edge storage device (e.g., a neighborhood node) associated with (e.g., proximate to) the user. In an aspect, the at least the second portion of the content can exclude the first portion of the content that was transmitted to the user device for streaming. Alternatively, the at least the second portion of the content can be appended to the first portion of the content streamed and cached in step 204. In another aspect, the at least the second portion of the content can comprise the entirety of the content. In an aspect, the time stamp stored in step 206 can be used can be used as a resume point to allow a user to resume the movie from the paused position.

In an aspect, the at least the second portion of the content can be stored for consumption on the user device. For example, the user device can comprise a storage device for storing content. In an aspect, the storage device can be integral with the user device. Alternatively, the storage device can be operatively connected to the user device. One particular example of such a user device comprises a DVR, which can comprise a storage device for storing scheduled recordings. Alternatively, a network DVR can be used for storing the scheduled recordings.

In an aspect, the at least the second portion of the content can be encrypted prior to pre-positioning. The at least the second portion of content can be transmitted to the user device via an encrypted stream. In an aspect, the at least the second portion of content can also be saved as an encrypted file on the user device. The encryption can be used to help prevent unauthorized access to the at least a second portion of the content. Alternatively, the at least a second portion of the content can be stored in an encrypted partition of the storage device.

When the user chooses to resume viewing the content, the at least the second portion of the content can be displayed to the user directly from the user device, without the need for the content server to transmit additional content data to the user device. In an aspect, some VOD content can be time limited, with a requirement that the user view the content within a predefined time period. In an aspect, the at least the second portion of the content can be stored with a time to live corresponding to the time period in which the VOD content must be viewed. Upon expiration of the time to live, the at least the second portion of the content can be deleted or made otherwise unavailable to the user. Accordingly, playback of the content can resume with no bandwidth utilization at the content server.

Figure 3:
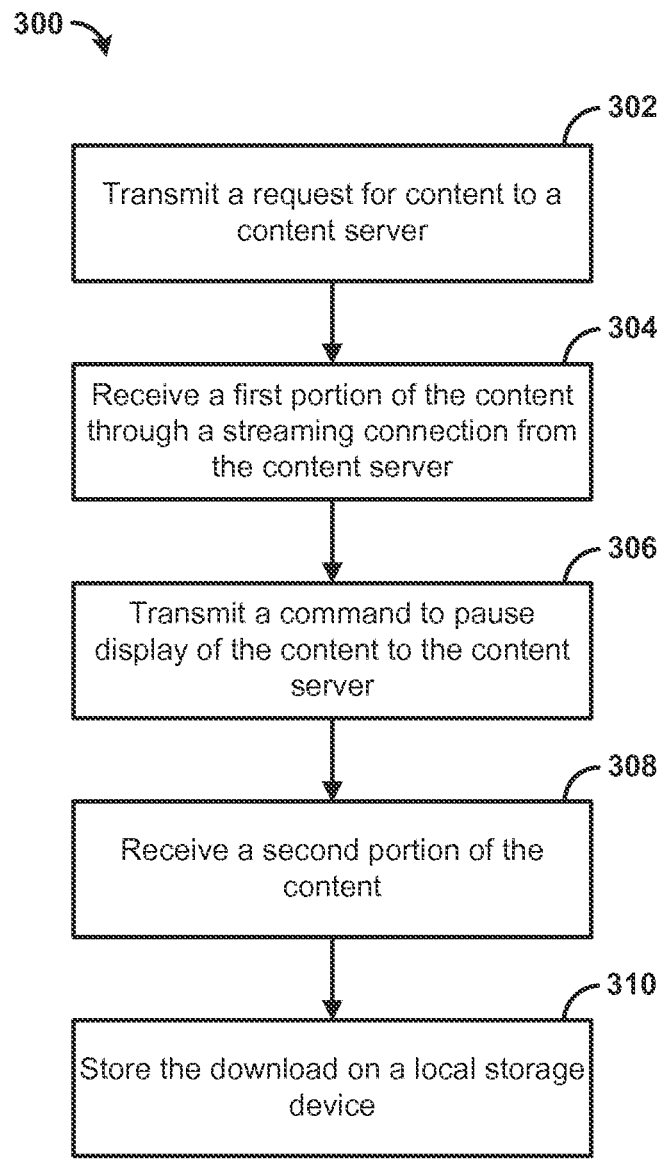
FIG. 3 is a flowchart illustrating an example method.

Alternatively, when the user chooses to resume viewing the content, a user authorization to view the content (e.g., user entitlement) can be checked at the content server or at a separate entitlement server prior to resuming viewing the content. In response to an indication from the content server that the user is entitled to view the content, the content is displayed from the local storage of the user device. Accordingly, only a very small amount of data needs to be transmitted from the content server FIG. 3 is a flowchart illustrating another example method 300. At step 302, a user device can transmit a request for content to a content sever (e.g., a VOD server, such as the server 110). The request for content can be transmitted according to an Internet protocol (IP). The request can comprise an identifier to be used by the VOD server for identifying what content is being requested (e.g., a title of a content item, an identification number associated with the content item, etc.). Content can be, for example, VOD content. In an aspect, the user device can comprise a set top box, a digital video recorder (DVR), a smart TV, a smartphone, a tablet computer, a laptop computer, and the like.

In response to the request for content, the content server can transmit the requested content to the user device. In an aspect, transmitting the content to the user device can comprise streaming the content to the user device. In an aspect, streaming can comprise transmitting the content from the content server to the user device such that the user device can begin presenting the content prior to receiving the entire content file. For example, encoded audio and video streams can be assembled in a container bitstream such as MP4, FLV, WebM, ASF or ISMA. Streaming audio and video can be transmitted using protocols such as the Internet protocol suite, including transmission control protocol (TCP/IP), hypertext transfer protocol (HTTP), and the like. In an aspect, one or more portions of the content can be stored in a cache as it is received. In an aspect, the content can be compressed using a compression algorithm selected based on the capabilities of the user device and/or the content server, and the content being compressed. For example, audio content can be compressed using a codec such as MP3, Vorbis, AAC, or the like, and video content can be compressed using a codec such as H.264 or VP8, or the like.

In step 304, the user device can receive the requested content from the content server. In an aspect, receiving the content at the user device can comprise receiving the bitstream from the content server. The user device can receive the content transmission and provide the transmitted content to a user. In an aspect, providing the content to the user can comprise receiving the container bitstream, and separating the bitstream into component streams, such as a video stream and an audio stream. The video and audio streams contained in the bitstream can be separately decompressed using the same codecs used to compress the audio and video. The decompressed streams can then be presented to the user through the user device. During presentation, the user can provide a teardown command (e.g., pause, stop, exit, etc.) by interacting with the user device. For example, the user can interact using a remote control associated with the user device, an on-screen control associated with the user device, etc.

In step 306, the user device can transmit a teardown command (e.g., pause, stop, exit, etc.) to the content server to suspend transmission of the content. In an aspect, the teardown command can comprise a timestamp. As examples, the timestamp can indicate a time relative to a beginning of the content that the teardown command was issued, an absolute time that can be used to calculate the time relative to the beginning of the content that the teardown command was issued, and the like. In an aspect, the teardown command can be transmitted after a first portion of the content has been transmitted to the user device. The first portion of the content can comprise a portion of the content presented to the user before receiving the teardown command. In an aspect, the teardown command can be received from the user at the user device. For example, the user can issue a teardown command using a remote control associated with the user device, by interacting with controls displayed on a display associated with the user device, or the like. In an aspect, the teardown command issued by the user can cause the user device to suspend playback of the content. In an aspect, the user device can transmit the teardown command to the content server. In response to receipt of the teardown command, the content server can temporarily cease transmitting the content to the user device.

In step 308, the user device can receive at least a second portion of the content from the content server. For example, the content can be transmitted to the user device from the content server. In some aspects, the at least the second portion of the content can be received as a download. In an aspect, the at least the second portion of the content can be received in response to a determination that playback of the content is likely to be resumed at a peak time. In an aspect that at least the second portion of the content can comprise the entirety of the content. In another aspect, the at least the second portion of the content can be appended to the first portion of content.

In an aspect, the content server can determine that content is to be resumed at a peak time if the content remains paused for a predefined time period. For example, if the content stream is paused for more than five minutes, the content server can determine that the content stream will resume playback during a peak time. In an aspect, the content server can determine that if content is paused during a peak time period, it if likely that the content will be resumed during a peak time period as well.

In another aspect, the content server can first determine a time of day that the user is likely to resume playback of the content. In an aspect, historical data from one or more users can be used to determine when content is likely to be resumed. In an aspect, the historical data can be retrieved from the content server or another server controlled by the content provider. For example, the historical data can comprise at least a time at which one or more users requested a content item and a time at which the one or more users paused streaming of the content item can be correlated with a time that streaming of the content item is resumed. In an aspect the historical data can be based on the particular user that submitted the content request, users geographically close to the particular user, users who viewed the same content, a random sampling of users, or all users. In another aspect, the historical data can be associated with the content itself, rather than being based on the user. For example, particular kinds of content can be determined to be more likely to be resumed during peak times, while other types of content (e.g., children's shows) can be determined to be less likely to be resumed during peak times.

The content server can determine a peak time. The peak time is a time when the content server is busy (e.g., its peak utilization). In an aspect, the peak time can be based on, for example, predefined times when the content server is typically busy. For example, if the content server typically experiences heavy traffic between the hours of 8:00 pm and 11:00 pm, then peak time can be identified as 8:00 pm until 11:00 pm. In another aspect, the peak time can be determined based on expected bandwidth utilization at the content server at the time the user is expected to resume playback. The expected bandwidth utilization can be determined based on, for example, one or more of bandwidth utilization 24 hours prior to the time the user is expected to resume playback, bandwidth utilization in one or more hours just prior to the time the user is expected to resume playback, and the like. As further examples, peak time can be determined based on time of day and/or day of week, or an overall bandwidth utilization at the content server. Factors that can affect peak time include, for example, location, user demographics, overall user density and the like. In an aspect, operators of the content server can determine peak times by other criteria. For example, peak times can include municipal holidays, public events (e.g., election days), natural events (e.g., "snow days" or other days that schools and/or offices are closed because of weather emergencies), and the like. The time the user is expected to resume playback can be compared to the determined peak time. For example, if the time the user is expected to resume playback overlaps with or is entirely contained within the peak time, it can be determined that the user is expected to resume playback of the content during a peak time.

In step 310, the downloaded content can be stored locally on a storage device associated with the user device. In an aspect, the storage device can comprise storage integrated with the user device. In another aspect, the storage device can be a device in communication with the user device, such as a network DVR. In an aspect, the at least the second portion of the content can exclude the first portion of the content that was transmitted to the user device for streaming. In another aspect, the at least the second portion of the content can comprise the entirety of the content.

In an aspect, the downloaded content can be stored locally on the storage device. For example, the user device can comprise a storage device for storing content. In an aspect, the storage device can be integral with the user device. Alternatively, the storage device can be operatively connected to the user device. One particular example of such a user device comprises a DVR, which can comprise a storage device for storing scheduled recordings. For example, the storage device can be any device proximate to the user device. As a particular example, the at least the second portion of the content can be positioned such that the at least the second portion of the content is far enough from the source (e.g., the content server) so as to avoid wasting bandwidth. In some aspects, determining a position at which the at least the second portion of the content can be stored can comprise identifying one or more portions of a network that are likely to be heavily taxed, and prepositioning the at least the second portion of the content downstream of the one or more portions of the network that are likely to be heavily taxed (e.g., between the one or more portions of the network that are likely to be heavily taxed and the user device).

In an aspect, a temporary partition can be created on the storage device to store the downloaded content. In an aspect, the temporary partition can be encrypted to help prevent unauthorized access to the at least a second portion of the content. In another aspect, the downloaded content can be encrypted prior to storing the content on the storage device. In an aspect, known encryption methods (e.g., SHA-1, etc.) can be used to encrypt the content and/or the temporary partition. The temporary partition is preferably sized to contain the at least the second portion of the content. In an aspect, the temporary partition is used to abstract the at least the second portion of the content and to help prevent unauthorized copies of content from being made available.

In an aspect, when the user chooses to resume viewing the content, the at least the second portion of the content can be displayed to the user directly from the user device, without the need for the content server to transmit additional content data to the user device. In an aspect, some VOD content can be time limited, with a requirement that the user view the content within a predefined time period. In an aspect, the at least the second portion of the content can be stored with a time to live corresponding to the time period in which the VOD content must be viewed. Upon expiration of the time to live, the at least the second portion of the content can be deleted or made otherwise unavailable to the user. Accordingly, playback of the content can resume with no bandwidth utilization at the content server.

Alternatively, when the user chooses to resume viewing the content, an authorization to view the content (e.g., user entitlement) can be checked at the content server (or at a separate entitlement server) prior to resuming viewing the content. In response to an indication from the content server (or entitlement server) that the user is entitled to view the content, the content is displayed from the local storage associated with the user device. Accordingly, only a very small amount of data needs to be transmitted from the content server.

In an aspect, the local storage device can be used to store additional data, other than VOD content. When the storage device reaches a predetermined threshold of unused storage space, downloaded VOD content can be deleted to create free space on the drive. As an example, when less than 500 megabytes of free storage space remains on the local storage device, VOD content can be deleted to create additional storage space.

Figure 4:
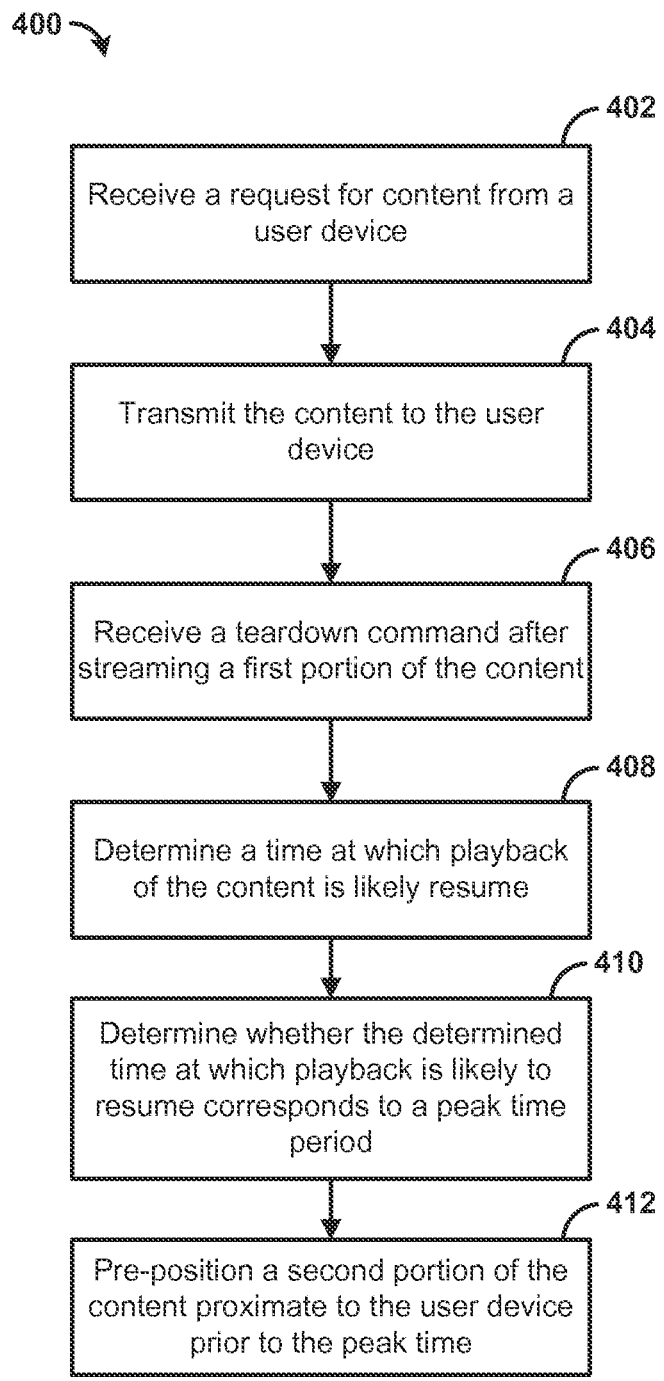
FIG. 4 is a flowchart illustrating an example method.

FIG. 4 is a flowchart illustrating an example method 400. At step 402, a content server (e.g., a VOD server, such as the server 110) can receive a request for content from a user device. The request for content can be received according to an Internet protocol. The request can comprise an identifier to be used by the VOD server to identify what content is being requested (e.g., a content item title, an identifier associated with the content item, etc.). In an aspect, the user device can comprise a set top box, a digital video recorder (DVR), a smart TV, a smartphone, a tablet computer, a laptop computer, and the like. In an aspect, when the user device comprises a device other than a set top box, content can be cached to a user set top box and retrieved by the user device leveraging existing technology.

In step 404, the content server can transmit the requested content to the user device. In an aspect, transmitting the content to the user device can comprise streaming the content to the user device. In an aspect, streaming can comprise transmitting the content from the content server to the user device such that the user device can begin presenting the content prior to receiving the entire content file. For example, encoded audio and video streams can be assembled in a container bitstream such as MP4, FLV, WebM, ASF or ISMA. Streaming audio and video can be transmitted using protocols such as the Internet protocol suite, including transmission control protocol (TCP/IP), hypertext transfer protocol (HTTP), and the like. In an aspect, the content can be compressed using a compression technology selected based on the capabilities of the user device, the content server, and/or the content being compressed. For example, audio content can be compressed using a codec such as MP3, Vorbis, AAC, or the like, and video content can be compressed using a codec such as H.264 or VP8, or the like.

The user device can receive the content stream and provide the streamed content to a user. In an aspect, providing the content to the user can comprise receiving the container bitstream, and separating the bitstream into component streams, such as a video stream and an audio stream. The video and audio streams contained in the bitstream can be separately decompressed using the same codecs used to compress the audio and video. The decompressed streams can then be presented to the user through the user device. During presentation, the user can provide a teardown command (e.g., pause, stop, exit, etc.) by interacting with the user device. For example, the user can interact using a remote control associated with the user device, an on-screen control associated with the user device, etc.

In step 406, the content server can receive a teardown command (e.g., pause, stop, exit, etc.) that affects streaming of the content. In an aspect, the teardown command can comprise a timestamp. For example, the timestamp can indicate a time relative to a beginning of the content at which the teardown command was issued, an absolute time used to calculate, the time relative to the beginning of the content at which the teardown command was issued, and the like. In an aspect, the teardown command can be received after streaming a first portion of the content to the user device. In an aspect, the first portion of the content can comprise the portion of the content presented to the user before receiving the teardown command. In an aspect, the teardown command can be received from the user at the user device. For example, the user can issue a teardown command using a remote control associated with the user device, by interacting with controls displayed on a display associated with the user device, or the like. In an aspect, the teardown command issued by the user can cause the user device to suspend playback of the content. In an aspect, the user device can transmit the teardown command to the content server. In response to receipt of the teardown command, the content server can temporarily cease streaming the content to the user device. Further, the content server can store the timestamp received as part of the teardown command.

In step 408, the content server can determine a time at which the playback is likely to resume. In an aspect, historical data from one or more users can be used to determine when content is likely to be resumed. For example, data comprising at least a time at which one or more users requested a content item and a time at which the one or more users paused streaming of the content item can be correlated with a time that streaming of the content item is resumed. In an aspect the historical data can be based on the particular user that submitted the content request, users geographically close to the particular user, users who viewed the same content, a random sampling of users, or all users.

In an aspect, the content server can determine the likelihood that playback of content will be resumed at a peak time based on one or more of a user viewing history, user viewing patterns, a length of content, a percentage of the content that has already been played, cost of purchase of the content, a length of content rental, etc. A date (and/or day of the week) on which the program was requested can affect the time the program is likely to be resumed. For example, content that was ordered on Tuesday may be unlikely to be resumed until the peak viewing time on Wednesday, while content ordered Friday night may be more likely to be resumed Saturday morning. A user's historical usage of the network can also indicate that the user streams content primarily between the hours of 8:00 pm and 11:00 pm on weekdays (e.g., after the user is done with work for the day). As another example, particular programming may be more likely to be streamed at a certain time of day. For example, children's shows may be more likely to be streamed during the morning or afternoon, shows including graphic violence and/or other adult content can be more likely to be viewed after 10:00 pm. Holidays and long weekends can also affect the time at which content is likely to be resumed. For example, content ordered on the day prior to a holiday can be more likely to be resumed during off-peak times on the following day, when a user is likely to be off work. Further, likelihood of resuming content can be based on whether the content is first-run or has already been aired. For example, live and/or first-run content can be more likely to be resumed shortly after the content is paused, while content that has already been aired at least once can be more likely to be resumed at a later date. Still further, an amount of the content that has been watched can determine how likely the content is to be resumed. For example, if nearly all (e.g., approximately 95%) of a content item has been viewed (e.g., only the ending credits are unviewed), a user can be unlikely to resume playback of the content. A length of content can also influence the likelihood that viewing of the content item will be resumed. For example, a user may be likely to resume longer pieces of content (e.g., films, long-format television shows, and the like), while a user may be unlikely to resume shorter content items (e.g., movie trailers). Additionally, whether or not a user paid for the content can be related to the likelihood that the user will resume playback of the content. For example, when a user pays for content (e.g., a content rental), the user may be more likely to resume playback, while free content may be less likely to be resumed.

In step 410, the content server can determine whether the determined time at which playback is likely to be resumed corresponds to a peak time period. In an aspect, the content server can determine that content is to be resumed at a peak time if the content remains paused for a predefined time period. For example, if the content stream is paused for more than five minutes, the content server can determine that the content stream will resume playback during a peak time. In an aspect, the content server can determine that if content is paused during a peak time period, is likely to be resumed at a peak time period as well.

In another aspect, the content server can determine a peak time period. The peak time is a time when the content server is busy (e.g., its peak bandwidth utilization). In an aspect, the peak time period can be based on, for example, predefined times when the content server is typically busy. For example, if the content server typically experiences heavy traffic between the hours of 8:00 pm and 11:00 pm, then peak time can be identified as 8:00 pm until 11:00 pm. In another aspect, the peak time can be determined based on expected bandwidth utilization at the content server at the time the user is expected to resume playback. The expected bandwidth utilization can be determined based on, for example, one or more of bandwidth utilization 24 hours prior to the time the user is expected to resume playback, bandwidth utilization in one or more hours just prior to the time the user is expected to resume playback, and the like. As further examples, peak time can be determined based on time of day and/or day of week, or an overall bandwidth utilization at the content server. Factors that can affect peak time include, for example, location, user demographics, overall user density and the like. In an aspect, operators of the content server can determine peak times by other criteria. For example, peak times can include municipal holidays, public events (e.g., election days), natural events (e.g., "snow days" or other days that schools and/or offices are closed because of weather emergencies), and the like. The time the user is expected to resume playback can be compared to the determined peak time to determine if the time the user is expected to resume playback corresponds to the determined peak time period. For example, if the time the user is expected to resume playback overlaps or is completely contained within the determined peak time period, it is determined that playback is likely to resume during a peak time period.

In step 412, the content server can pre-position at least a second portion of the content proximate to the user device prior to the peak time. In an aspect, pre-positioning can comprise transmitting the at least a second portion of the content to a storage device associated with the user device as a download. For example, the content can be transmitted to the user device and stored locally on a storage device associated with the user device. In some aspects, at least the second portion of the content can be pre-positioned at a local DVR, a cloud-based DVR, a storage device associated with the user device, an edge storage device or a neighborhood node associated with the user device, and/or the like. For example, the user device can comprise a storage device and the local storage can comprise the storage device. As another example, the local storage can comprise a network DVR associated with the user device. In an aspect, the at least the second portion of the content can exclude the first portion of the content that was transmitted to the user device for streaming. In another aspect, the at least the second portion of the content can comprise the entirety of the content.

In an aspect, the at least the second portion of the content can be stored locally on the storage device. For example, the user device can comprise a storage device for storing content. In an aspect, the storage device can be integral with the user device. Alternatively, the storage device can be operatively connected to the user device. One particular example of such a user device comprises a network DVR, which can comprise a storage device for storing scheduled recordings. In another aspect, the at least the second portion of the content can be stored proximate to the user device. As a particular example, the at least the second portion of the content can be positioned such that the at least the second portion of the content is far enough from the source (e.g., the content server) so as to avoid wasting bandwidth. In some aspects, determining a position at which the at least the second portion of the content can be stored can comprise identifying one or more portions of a network that are likely to be heavily taxed, and prepositioning the at least the second portion of the content downstream of the one or more portions of the network that are likely to be heavily taxed (e.g., between the one or more portions of the network that are likely to be heavily taxed and the user device).

In an aspect, the at least the second portion of the content can be encrypted prior to pre-positioning. The encryption can be used to help prevent unauthorized access to the at least a second portion of the content. Alternatively, the at least a second portion of the content can be stored in an encrypted partition of the storage device.

When the user chooses to resume viewing the content, the at least the second portion of the content can be displayed to the user directly from the user device, without the need for the content server to transmit additional content data to the user device. In an aspect, some VOD content can be time limited, with a requirement that the user view the content within a predefined time period. In an aspect, the at least the second portion of the content can be stored with a time to live corresponding to the time period in which the VOD content must be viewed. Upon expiration of the time to live, the at least the second portion of the content can be deleted or made otherwise unavailable to the user. Accordingly, playback of the content can resume with no bandwidth utilization at the content server.

Alternatively, when the user chooses to resume viewing the content, an authorization to view the content (i.e., user entitlement) can be checked at the content server prior to resuming viewing the content. In response to an indication from the content server that the user is entitled to view the content, the content is displayed from the local storage of the user device. Accordingly, only a very small amount of data needs to be transmitted from the content server.

Figure 5:
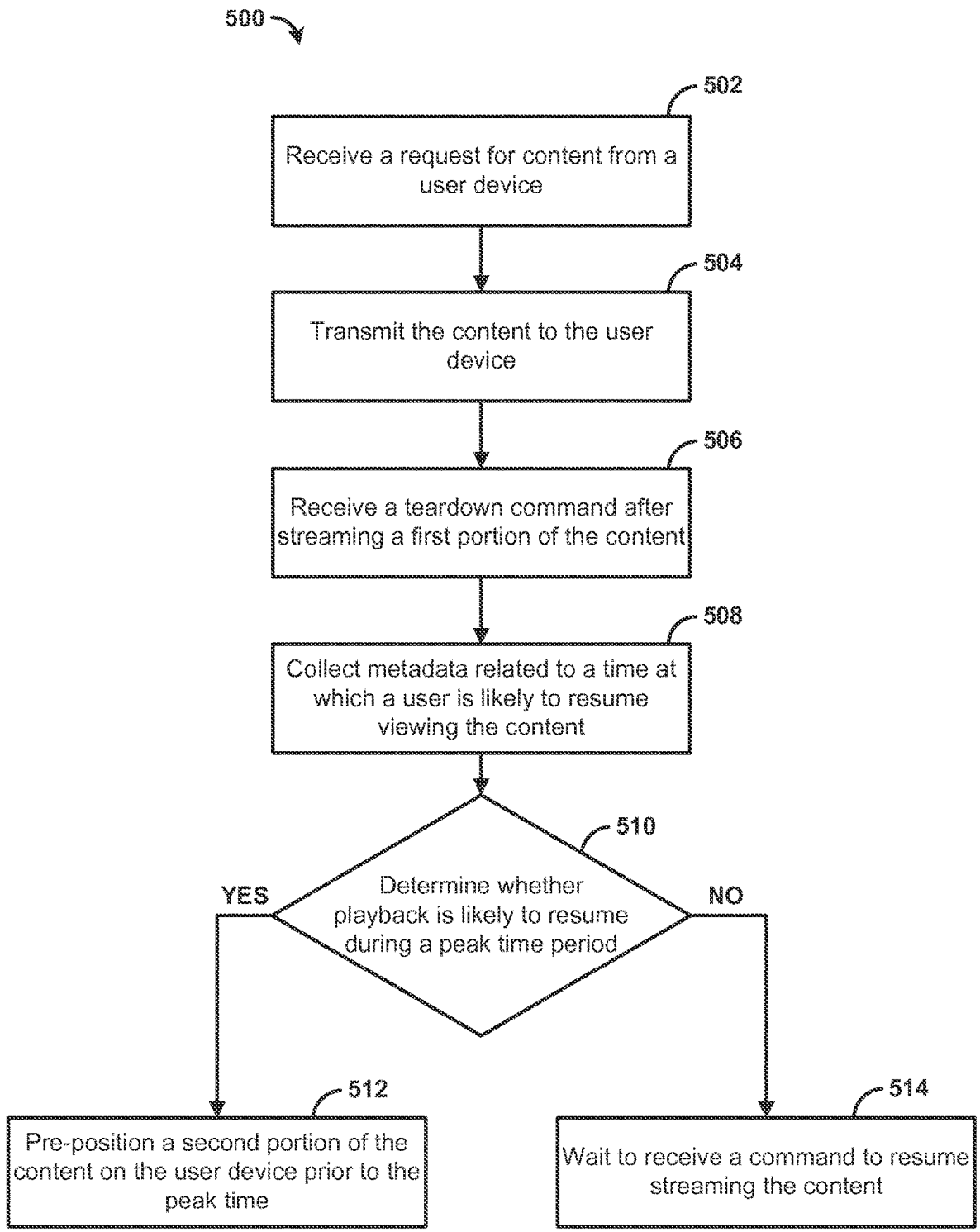
FIG. 5 is a flowchart illustrating an example method.

FIG. 5 is a flowchart illustrating another example method 500. In step 502, a content server (e.g., a VOD server, such as the server 110) can receive a request for content from a user device. The request for content can be received according to an Internet protocol (e.g., IPv4, IPv6). The request can comprise an identifier to be used by the VOD server to identify what content is being requested (e.g., a content tile, an identifying number associated with the content item). The content can be, for example, VOD content. In an aspect, the user device can comprise a set top box, a digital video recorder (DVR), a smart TV, a smartphone, a tablet computer, a laptop computer, and the like. In an aspect, the request for content can comprise a content identifier, identifying the requested content. In an aspect, the request for content can further comprise a timestamp indicating a time the request for content was transmitted to the content server.

In step 504, the content server can transmit the requested content to the user device. In an aspect, transmitting the content to the user device can comprise streaming the content to the user device. In an aspect, streaming can comprise transmitting the content from the content server to the user device such that the user device can begin presenting the content prior to receiving the entire content file. For example, encoded audio and video streams can be assembled in a container bitstream, such as MP4, FLV, WebM, ASF, or ISMA. Streaming audio and video can be transmitted using protocols such as the internet protocol suite, including transmission control protocol (TCP/IP), hypertext transfer protocol (HTTP), and the like. In an aspect, one or more portions of the content can be compressed. For example, audio content can be compressed using a codec such as MP3, Vorbis, AAC, or the like, and video content can be compressed using a codec such as H.264 or VP8, or the like.

The user device can receive the content stream and provide the streamed content to a user. In an aspect, providing the content to the user can comprise receiving the container bitstream, and separating the bitstream into component streams, such as a video stream and an audio stream. The video and audio streams contained in the bitstream can be separately decompressed using the same codecs used to compress the audio and video. The decompressed streams can then be presented to the user through the user device. During presentation, the user can provide a teardown command (e.g., pause, stop, exit, etc.) by interacting with the user device. For example, the user can interact using a remote control associated with the user device, an on-screen control associated with the user device, etc.

In step 506, the content server can receive a teardown command (e.g., pause, stop, exit, etc.) to pause or suspend streaming of the content. In an aspect, the teardown command can be received after streaming a first portion of the content to the user device. In an aspect, the teardown command can comprise a timestamp. As examples, the timestamp can indicate a time relative to the beginning of the content that the teardown command was issued, an absolute time that can be used to calculate the time relative to the beginning of the content that the teardown command was issued, and the like. In an aspect, the teardown command can be received from the user at the user device. For example, the user can issue a teardown command using a remote control associated with the user device, by interacting with controls displayed on a display associated with the user device, or the like. In an aspect, the teardown command issued by the user can cause the user device to pause playback of the content. In an aspect, the user device can transmit the teardown command to the content server. In response to receipt of the teardown command, the content server can temporarily cease streaming the content to the user device.

In step 508, the content server can collect metadata related to a time at which the user is likely to resume viewing the content. For example, the metadata can comprise data related to the user, the content and/or the request for content. In an aspect, the collected metadata can be collected from the user device. In another aspect, the collected metadata can be collected from the content server or from another server associated with the content server (e.g., a metadata server).

In an aspect, the collected metadata can comprise information about the content indicating time when the content is likely to be consumed. In another aspect, the collected metadata can comprise historical data related to one or more users. In an aspect, the metadata can comprise information related to when a user is likely to resume viewing the content. For example, the collected metadata can comprise information regarding user habits. As a particular example, the metadata can indicate that he user typically stops watching content at 10:00 pm on weekdays, and at midnight on the weekend (e.g., based on historical tracking of the user's content consumption). The metadata can further indicate that the user typically begins watching content at 6:00 pm on weekdays, and at 2:00 pm on weekends. Accordingly, the metadata indicates that if the user stops watching a program at 10:00 pm on a Tuesday, he is likely to resume viewing the program at around 6:00 pm on Wednesday. For example, the collected metadata can comprise at least a time at which one or more users requested a content item and a time at which the one or more users paused streaming of the content item, correlated with a time that streaming of the content item is resumed. In an aspect the historical data can be based on a particular user that submitted the content request, users geographically close to the particular user, a random sampling of users, or all users.

In an aspect, the collected metadata can comprise historical data based on a content type of the requested content. In an aspect, the requested content can be associated with one or more content types. For example, content types can comprise a genre (e.g., drama, comedy, sports, children's, news and the like), a designation indicating whether the content is live or pre-recorded, and the like. For example, the collected metadata can comprise at least a time at which one or more users requested a content item of the content type associated with the requested content and a time at which the one or more users paused streaming of the content, correlated with a time that streaming of the content item is resumed. For example, a content item that is designated as having the "children's" content type can be found to be resumed at off-peak times (e.g., early morning).

In an aspect, the collected metadata can comprise information regarding a time at which the request for content was transmitted to the content server. In an aspect, a time that content playback is likely to be resumed can be presumed to correspond to the time at which the request for content was initially made.

In an aspect, the collected metadata can comprise historical data based on the requested content. For example, the collected metadata can comprise one or more of a time at which users requested the content and a time at which users paused the content, correlated with a time at which the users resumed streaming of the content.

In an aspect, the collected metadata can be used to determine a time at which the user is likely to resume playback of the content. For example, metadata can be used to determine a time at which the content item is likely to be resumed. Additionally, historical data can be used to determine a time that a user is likely to resume content playback. Times based on the metadata and the historical data can be used to predict a time at which a user is likely to resume a particular piece of content. The determined time can comprise, for example, an approximate time, a time period, and/or a coarse time designation (e.g., morning, afternoon, evening, late night, etc.). The determined time can be determined based on, for example, a user's historical viewing patterns, a type of content (e.g., content genre, content length, whether the content was purchased or rented, etc.).

In step 510, the content server can determine, based on the collected data, metadata, user preferences, user viewing habits and history, and the like, whether playback is likely to resume during a peak time period. In an aspect, the peak time period can comprise a time period during which the network bandwidth utilization at the content server exceeds a predefined threshold. For example, if the network bandwidth utilization at the content server exceeds 80%. Alternatively, the peak time period can be determined based on a time of day. For example, the peak time period can be from approximately 8:00 pm until approximately 11:00 pm. In another aspect, the peak time can be determined based on expected bandwidth utilization at the content server at the time the user is expected to resume playback. The expected bandwidth utilization can be determined based on, for example, one or more of bandwidth utilization 24 hours prior to the time the user is expected to resume playback, bandwidth utilization in one or more hours just prior to the time the user is expected to resume playback, and the like. As further examples, peak time can be determined based on time of day and/or day of week, or an overall bandwidth utilization at the content server. Factors that can affect peak time include, for example, location, user demographics, overall user density and the like. In an aspect, operators of the content server can determine peak times by other criteria. For example, peak times can include municipal holidays, public events (e.g., election days), natural events (e.g., "snow days" or other days that schools and/or offices are closed because of weather emergencies), and the like.

In an aspect, the content server can compare the determined time at which the user is likely to resume playback of the content with the peak time period. In an aspect, the content server can determine that the content is likely to be resumed during the peak time period when there is an overlap between the determined time at which the user is likely to resume playback of the content and the peak time period. In an alternative aspect, the content server can determine that the content is likely to be resumed during the peak time period only when the determined time at which the user is likely to resume playback of the content is entirely within the peak time period.

The determination that that the content is likely to be resumed during the peak time period can be made using an algorithm based on one or more of a date, a time, a usage pattern, historical trends, a type of content, a time at which content was ordered, user viewing patterns, special events (e.g., holidays, long weekends, etc.), and the like. A date (and/or day of the week) on which the program was requested can affect the time the program is likely to be resumed. For example, content that was ordered on Tuesday may be unlikely to be resumed until the peak viewing time on Wednesday, while content ordered Friday night may be more likely to be resumed Saturday morning. A user's historical usage of the network can also indicate that the user streams content primarily between the hours of 8:00 pm and 11:00 pm on weekdays (e.g., after the user is done with work for the day). As another example, particular programming may be more likely to be streamed at a certain time of day. For example, children's shows may be more likely to be streamed during the morning or afternoon, shows including graphic violence and/or other adult content can be more likely to be viewed after 10:00 pm. Holidays and long weekends can also affect the time at which content is likely to be resumed. For example, content ordered on the day prior to a holiday can be more likely to be resumed during off-peak times on the following day, when a user is likely to be off work.

In step 512, the content server can pre-position a second portion of the content proximate to the user device or a network DVR associated with the user device prior to the peak time period, when it is determined that playback is likely to resume during the peak time period. In an aspect, pre-positioning can comprise transmitting the at least a second portion of the content to the user device or the network DVR as a download. For example, the content can be transmitted to the user device or the network DVR and stored locally on a storage device. In some aspects, at least the second portion of the content can be pre-positioned at a local DVR, a cloud-based DVR, a storage device associated with the user device, an edge storage device or a neighborhood node associated with the user device, and/or the like. In an aspect, the at least the second portion of the content can exclude the first portion of the content that was transmitted to the user device for streaming. In another aspect, the at least the second portion of the content can comprise the entirety of the content.

In an aspect, the at least the second portion of the content can be stored locally on the user device. For example, the user device can comprise a storage device for storing content. In an aspect, the storage device can be integral with the user device. Alternatively, the storage device can be operatively connected to the user device. One particular example of such a user device comprises a DVR, which can comprise a storage device for storing scheduled recordings. In another aspect, the at least the second portion of the content can be positioned proximate to the user device. As an example, the at least the second portion of the content can be positioned such that the at least the second portion of the content is far enough from the source (e.g., the content server) so as to avoid wasting bandwidth. In some aspects, determining a position at which the at least the second portion of the content can be stored can comprise identifying one or more portions of a network that are likely to be heavily taxed, and prepositioning the at least the second portion of the content downstream of the one or more portions of the network that are likely to be heavily taxed (e.g., between the one or more portions of the network that are likely to be heavily taxed and the user device).

In an aspect, the at least the second portion of the content can be encrypted prior to pre-positioning. The encryption can be used to help prevent unauthorized access to the at least a second portion of the content. Alternatively, the at least a second portion of the content can be stored in an encrypted partition of the storage device. In an aspect, known encryption standards, such as SHA-1 can be used to encrypt the at least the second portion of the content.

When the user chooses to resume viewing the content, the at least the second portion of the content can be displayed to the user directly from the user device, without the need for the content server to transmit additional content data to the user device. In an aspect, some VOD content can be time limited, with a requirement that the user view the content within a predefined time period. In an aspect, the at least the second portion of the content can be stored with a time to live corresponding to the time period in which the VOD content must be viewed. Upon expiration of the time to live, the at least the second portion of the content can be deleted or made otherwise unavailable to the user. Accordingly, playback of the content can resume with no bandwidth utilization at the content server.

Alternatively, in step 514, the content server can wait for a command to resume the stream, when it is determined that playback is not likely to resume during the peak time period.

Figure 6:
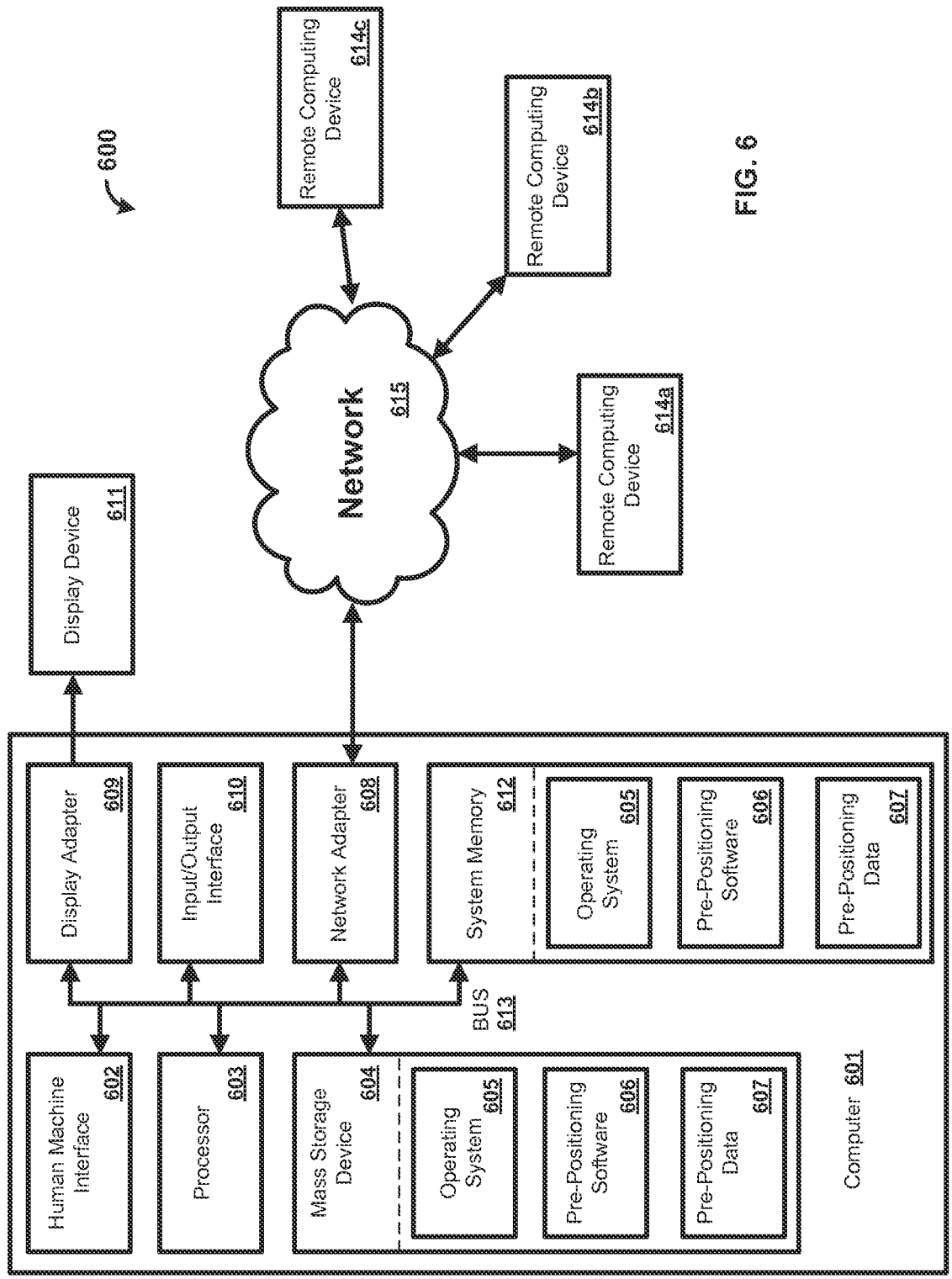
FIG. 6 is a block diagram illustrating an example computing device.

In an exemplary aspect, the methods and systems can be implemented on a computer 601 as illustrated in FIG. 6 and described below. By way of example, server 110 of FIG. 1 can be a computer 601 as illustrated in FIG. 6. Similarly, the methods and systems disclosed can utilize one or more computers to perform one or more functions in one or more locations. FIG. 6 is a block diagram illustrating an exemplary operating environment 600 for performing the disclosed methods. This exemplary operating environment 600 is only an example of an operating environment and is not intended to suggest any limitation as to the scope of use or functionality of operating environment architecture. Neither should the operating environment 600 be interpreted as having any dependency or requirement relating to any one or combination of components illustrated in the exemplary operating environment 600.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 601. The computer 601 can comprise one or more components, such as one or more processors 603, a system memory 612, and a bus 613 that couples various components of the computer 601 including the one or more processors 603 to the system memory 612. In the case of multiple processors 603, the exemplary operating environment 600 can utilize parallel computing.

The bus 613 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and one or more of the components of the computer 601, such as the one or more processors 603, a mass storage device 604, an operating system 605, pre-positioning software 606, pre-positioning data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 can comprise computer readable media in the form of volatile memory, such as random access memory (RAM), and/or non-volatile memory, such as read only memory (ROM). The system memory 612 typically can comprise data such as pre-positioning data 607 and/or program modules such as operating system 605 and pre-positioning software 606 that are accessible to and/or are operated on by the one or more processors 603.

In another aspect, the computer 601 can also comprise other removable/non-removable, volatile/non-volatile computer storage media. The mass storage device 604 can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and pre-positioning software 606. One or more of the operating system 605 and pre-positioning software 606 (or some combination thereof) can comprise program modules and the pre-positioning software 606. Pre-positioning data 607 can also be stored on the mass storage device 604. Pre-positioning data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 615.

The pre-positioning software 606 and the pre-positioning data 607 can be used to determine whether content should be pre-positioned at a user device. In an aspect, the determination can comprise determining when the user is likely to resume viewing the requested content, and whether that time corresponds to a peak time period.

In another aspect, the user can enter commands and information into the computer 601 via an input device. Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 603 via a human machine interface 602 that is coupled to the bus 613, but can be connected by other interface and bus structures, such as a parallel port, game port, an IEEE 1394 Port (also known as a Firewire port), a serial port, network adapter 608, and/or a universal serial bus (USB).

In yet another aspect, a display device 611 can also be connected to the bus 613 via an interface, such as a display adapter 609. It is contemplated that the computer 601 can have more than one display adapter 609 and the computer 601 can have more than one display device 611. For example, a display device 611 can be a monitor, an LCD (Liquid Crystal Display), light emitting diode (LED) display, television, smart lens, smart glass, and/or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device 614a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components can reside at various times in different storage components of the computing device 601, and are executed by the one or more processors 603 of the computer 601. An implementation of pre-positioning software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a content server from a user device, a request for a content item;
   initiating sending, to the user device, the content item;
   receiving, at a first time, a teardown command to suspend sending the content item after a first portion of the content item has been sent to the user device, wherein the teardown command comprises a timestamp indicative of a time associated with the teardown command;
   determining that playback of the content item is likely to be resumed during a peak time period after the first time, wherein the peak time period is when a utilization of the content server satisfies a threshold;
   determining, based on the timestamp, a resume point indicative of a second portion of the content item for playback during the peak time period; and
   pre-positioning, based on the resume point and during an off-peak time period when the utilization of the content server does not satisfy the threshold, the second portion of the content item proximate to the user device.

2. The method of claim 1, wherein pre-positioning, the second portion of the content item proximate to the user device comprises sending, to the user device, at least the second portion of the content item as a download for storage.

3. The method of claim 1, wherein pre-positioning the second portion of the content item proximate to the user device comprises pre-positioning the second portion of the content item at a memory in communication with the user device.

4. The method of claim 1, wherein determining that playback of the content item is likely to be resumed during the peak time period after the first time comprises:
  determining a time of day that playback of the content item is likely to be resumed; and
  comparing the determined time of day that playback of the content item is likely to be resumed with the peak time period.

5. The method of claim 4, wherein determining the time of day that playback of the content item is likely to be resumed comprises:
  retrieving historical data associated with the user device;
  determining, based on the historical data, one or more viewing patterns associated with the user device; and
  determining, based on the one or more viewing patterns, the time of day that playback of the content item is likely to be resumed by the user device.

6. The method of claim 1, wherein determining that playback of the content item is likely to be resumed during the peak time period after the first time comprises:
  determining a time of day that playback of the content item is likely to be resumed; and
  determining an expected upload bandwidth utilization of the content server at the time that playback of the content item is likely to be resumed, wherein the peak time period is a period of time during which an expected upload bandwidth utilization of the content server satisfies a second threshold.

7. The method of claim 6, wherein the expected upload bandwidth utilization is based on historical data regarding upload bandwidth utilization of the content server.

8. The method of claim 1, further comprising deleting, after expiration of a time period, the second portion of the content item.

9. A method, comprising:
  sending, to a content server, a request for a content item;
  receiving, by a user device, a first portion of the content item via a streaming connection with the content server;
  sending, to the content server at a first time, a teardown command to suspend sending of the content item, wherein the teardown command comprises a timestamp indicative of a time associated with the teardown command;
  after a determination that playback of the content item is likely to be resumed during a peak time period, receiving, during an off-peak time period when a utilization of the content server does not satisfy a threshold, a second portion of the content item at a resume point determined from the timestamp, wherein the resume point is for playback during the peak time period, and wherein the peak time period is when utilization of the content server satisfies the threshold; and
  storing, in a memory in communication with the user device, the second portion of the content item.

10. The method of claim 9, further comprising sending the second portion of the content item for playback from the memory.

11. The method of claim 9, wherein the second portion of the content item is stored on an encrypted partition of the memory.

12. The method of claim 9, wherein the determination that playback of the content item is likely to be resumed during the peak time period comprises:
  determining a time of day that playback of the content item is likely to be resumed; and
  comparing the determined time of day that playback of the content item is likely to be resumed with the peak time period.

13. The method of claim 9, wherein the determination that playback of the content item is likely to be resumed during the peak time period comprises:
  determining a time of day that playback of the content item is likely to be resumed; and
  determining an expected upload bandwidth utilization of the content server at the time that playback of the content item is likely to be resumed, and wherein the peak time period is a period of time during which the expected upload bandwidth utilization of the content server satisfies a second threshold.

14. The method of claim 9, further comprising deleting, after expiration of a time period, the second portion of the content item.

15. The method of claim 11, further comprising deleting, after a determination that the memory satisfies a predetermined threshold of used space, the encrypted partition.

16. A method comprising:
  receiving, by a content server from a user device, a request for a content item;
  initiating sending, to the user device, the content item;
  receiving, at a first time, a teardown command to suspend sending of the content item after a first portion of the content item has been sent to the user device, wherein the teardown command comprises a timestamp indicative of a time associated with the teardown command;
  receiving metadata related to a time the user device is likely to resume viewing the content item;
  determining, based on the received metadata, whether playback of the content item is likely to be resumed during a peak time period, wherein the peak time period is when a utilization of the content server satisfies a threshold;
  determining, based on the timestamp, a resume point of a second portion of the content item for playback during the peak time period; and
  determining that playback of the content item is likely to be resumed during the peak time period;
  pre-positioning, after determining that playback of the content item is likely to be resumed during the peak time period, the second portion of the content item proximate to the user device during an off-peak time period when the utilization of the content server does not satisfy the threshold.

17. The method of claim 16, wherein the received metadata comprises historical data related to one or more users.

18. The method of claim 16, wherein the received metadata comprises historical data based on the content item.

19. The method of claim 16, wherein the received metadata comprises information regarding a time that the request for the content item was received.

20. The method of claim 16, wherein the received metadata comprises historical data based on a content type of the content item.

* * * * *